(12) United States Patent
Senf, Jr. et al.

(10) Patent No.: US 11,098,943 B2
(45) Date of Patent: Aug. 24, 2021

(54) TRANSPORTATION REFRIGERATION SYSTEM WITH UNEQUAL SIZED HEAT EXCHANGERS

(71) Applicant: Carrier Corporation, Palm Beach Gardens, FL (US)

(72) Inventors: Raymond L. Senf, Jr., Palm Beach Gardens, FL (US); Herbert J. Call, Palm Beach Gardens, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 44 days.

(21) Appl. No.: 16/290,223

(22) Filed: Mar. 1, 2019

(65) Prior Publication Data
US 2019/0316827 A1 Oct. 17, 2019

Related U.S. Application Data

(60) Provisional application No. 62/657,221, filed on Apr. 13, 2018.

(51) Int. Cl.
*F25D 11/02* (2006.01)
*F25D 11/00* (2006.01)
*F25D 17/06* (2006.01)

(52) U.S. Cl.
CPC .......... *F25D 11/022* (2013.01); *F25D 11/003* (2013.01); *F25D 17/06* (2013.01)

(58) Field of Classification Search
CPC ...... F25D 11/022; F25D 11/003; F25D 17/06; F25B 5/02
See application file for complete search history.

(56) References Cited

U.S. PATENT DOCUMENTS

| 4,326,452 A * | 4/1982 | Nawa | F15D 1/08 454/258 |
|---|---|---|---|
| 5,129,235 A | 7/1992 | Renken et al. | |
| 6,357,248 B1 | 3/2002 | Bongaards et al. | |
| 6,497,113 B1 | 12/2002 | Yamada et al. | |
| 6,543,245 B1 | 4/2003 | Waldschmidt et al. | |
| 6,553,778 B2 | 4/2003 | Tipton et al. | |
| 6,857,286 B2 * | 2/2005 | Ohta | B60H 1/323 62/498 |
| 7,845,185 B2 * | 12/2010 | Knight | F24F 3/153 62/196.4 |

(Continued)

FOREIGN PATENT DOCUMENTS

| CN | 1420334 A | 5/2003 |
|---|---|---|
| DE | 4122165 | 1/1993 |

(Continued)

OTHER PUBLICATIONS

European Extended Search Report for EP Application No. 19168785.4 dated Sep. 19, 2019.

*Primary Examiner* — Ana M Vazquez
(74) *Attorney, Agent, or Firm* — Carlson, Gaskey & Olds, P.C.

(57) ABSTRACT

A transportation refrigeration system includes a refrigeration circuit that includes a compressor, a condenser, a first expansion device upstream of a first heat exchanger and a second expansion device upstream of a second heat exchanger. The first heat exchanger includes a first cooling capacity that is different from a second cooling capacity of the second heat exchanger.

21 Claims, 1 Drawing Sheet

(56) References Cited

U.S. PATENT DOCUMENTS

| | | | |
|---|---|---|---|
| 7,966,838 B2* | 6/2011 | Lifson | F25B 41/043 |
| | | | 62/217 |
| 8,037,704 B2 | 10/2011 | Viegas | |
| 8,266,917 B2 | 9/2012 | Waldschmidt et al. | |
| 8,938,988 B2 | 1/2015 | Yanik et al. | |
| 9,297,548 B2* | 3/2016 | Mijanovic | F25B 5/02 |
| 2002/0134095 A1* | 9/2002 | Temmyo | F25D 29/00 |
| | | | 62/179 |
| 2007/0251685 A1 | 11/2007 | Viegas | |
| 2010/0107661 A1 | 5/2010 | Awwad et al. | |
| 2011/0113803 A1 | 5/2011 | Ahh et al. | |
| 2011/0209490 A1 | 9/2011 | Mijanovic | |
| 2012/0000222 A1 | 1/2012 | Fink et al. | |
| 2012/0252341 A1* | 10/2012 | Maehata | B60H 1/00828 |
| | | | 454/75 |
| 2015/0202945 A1* | 7/2015 | Bushnell | B60H 1/3232 |
| | | | 454/141 |
| 2015/0316311 A1 | 11/2015 | Kopecka et al. | |
| 2016/0334142 A1 | 11/2016 | Senf, Jr. et al. | |
| 2017/0248359 A1 | 8/2017 | Koppomeedi | |

FOREIGN PATENT DOCUMENTS

| | | |
|---|---|---|
| DE | 10010718 | 9/2001 |
| EP | 2075516 | 7/2009 |
| EP | 2423623 | 2/2012 |
| WO | 2010051198 | 5/2010 |

\* cited by examiner

TRANSPORTATION REFRIGERATION SYSTEM WITH UNEQUAL SIZED HEAT EXCHANGERS

CROSS-REFERENCE TO RELATED APPLICATIONS

This application claims priority to U.S. Provisional Application No. 62/657,221, which was filed on Apr. 13, 2018 and is incorporated herein by reference.

BACKGROUND

This application relates to refrigeration systems having at least two heat absorption heat exchangers in parallel for cooling an enclosed cargo space.

Refrigeration systems are known. Generally, a compressor compresses a refrigerant and delivers it into a condenser. The refrigerant is cooled and passes through an expansion valve. The refrigerant is expanded and passes through an evaporator. The evaporator cools air to be delivered into an environment to be conditioned.

One application for such refrigeration systems is in a transportation refrigeration system. As an example, a truck may have a refrigerated trailer. It is known to provide distinct temperatures at distinct compartments within a common trailer. Individual refrigeration circuits are often utilized to provide the distinct temperatures.

SUMMARY

In one exemplary embodiment, a transportation refrigeration system includes a refrigeration circuit that includes a compressor, a condenser, a first expansion device upstream of a first heat exchanger and a second expansion device upstream of a second heat exchanger. The first heat exchanger includes a first cooling capacity that is different from a second cooling capacity of the second heat exchanger.

In a further embodiment of the above, a first compartment passageway has a first compartment passageway inlet that is located upstream of the first heat exchanger. A first fan is located downstream of the first heat exchanger.

In a further embodiment of any of the above, a first nozzle is downstream of the first fan and has a first compartment outlet.

In a further embodiment of any of the above, a second compartment passageway has a second compartment passageway inlet that is located upstream of the second heat exchanger. A second fan is located downstream of the second heat exchanger.

In a further embodiment of any of the above, a second nozzle is downstream of the second fan and has a second compartment outlet.

In a further embodiment of any of the above, the first compartment outlet is spaced from the second compartment outlet.

In a further embodiment of any of the above, the first cooling capacity is greater than the second cooling capacity. The first fan includes a first maximum flow rate. The second fan includes a second maximum flow rate that is less than the first maximum flow rate.

In a further embodiment of any of the above, the first cooling capacity includes at least 55% of a total cooling capacity of the refrigeration system. The second cooling capacity includes no more than 45% of the total cooling capacity of the refrigeration system.

In a further embodiment of any of the above, the first cooling capacity includes at least two thirds of the total cooling capacity of the refrigeration system. The second cooling capacity includes no more than one third of the total cooling capacity of the refrigeration system.

In a further embodiment of any of the above, the first heat exchanger includes a first fin density and the second heat exchanger includes a second fin density. The first fin density is different from the second fin density.

In a further embodiment of any of the above, the first heat exchanger includes a first exchanger face surface area. The second heat exchanger includes a second exchanger face surface area. The first exchanger face surface area is greater than the second exchanger face surface area.

In a further embodiment of any of the above, the first expansion device is a first electronically controlled expansion valve. The second expansion device is a second electronically controlled expansion valve. A controller is configured to control refrigerant flow to the first heat exchanger by controlling the first electronically controlled expansion valve. The controller is configured to control refrigerant flow to the second heat exchanger by controlling the second electronically controlled expansion valve.

In another exemplary embodiment, a method of operating a refrigeration cycle includes the steps of conditioning a first compartment in a cargo space to a first temperature with a first heat exchanger that has a first cooling capacity. A second compartment in the cargo space is conditioned to a second temperature with a second heat exchanger that has a second cooling capacity. The first cooling capacity is greater than the second cooling capacity.

In a further embodiment of any of the above, the first cooling capacity includes at least 55% of a total cooling capacity of the refrigeration system. The second cooling capacity includes no more than 45% of the total cooling capacity of the refrigeration system.

In a further embodiment of any of the above, the first cooling capacity includes at least two thirds of the total cooling capacity of the refrigeration system. The second cooling capacity includes no more than one third of the total cooling capacity of the refrigeration system.

In a further embodiment of any of the above, the first heat exchanger includes a first fin density and the second heat exchanger includes a second fin density. The first fin density is different from the second fin density.

In a further embodiment of any of the above, the first heat exchanger includes a first exchanger face surface area. The second heat exchanger includes a second exchanger face surface area. The first exchanger face surface area is greater than the second exchanger face surface area.

In a further embodiment of any of the above, a first fan associated with the first heat exchanger is operated at a first maximum flow rate. A second fan associated with the second heat exchanger is operated at a second maximum flow rate that is less than the first maximum flow rate.

In a further embodiment of any of the above, the method of operating the first fan includes drawing air from the first compartment into a first compartment passageway inlet, over the first heat exchanger and through a first nozzle having a first compartment passageway outlet.

In a further embodiment of any of the above, the method of operating the second fan includes drawing air from the second compartment into a second compartment passageway inlet, over the second heat exchanger and through a second nozzle having a second compartment passageway outlet spaced from the first compartment passageway outlet.

DETAILED DESCRIPTION

Figure 1:
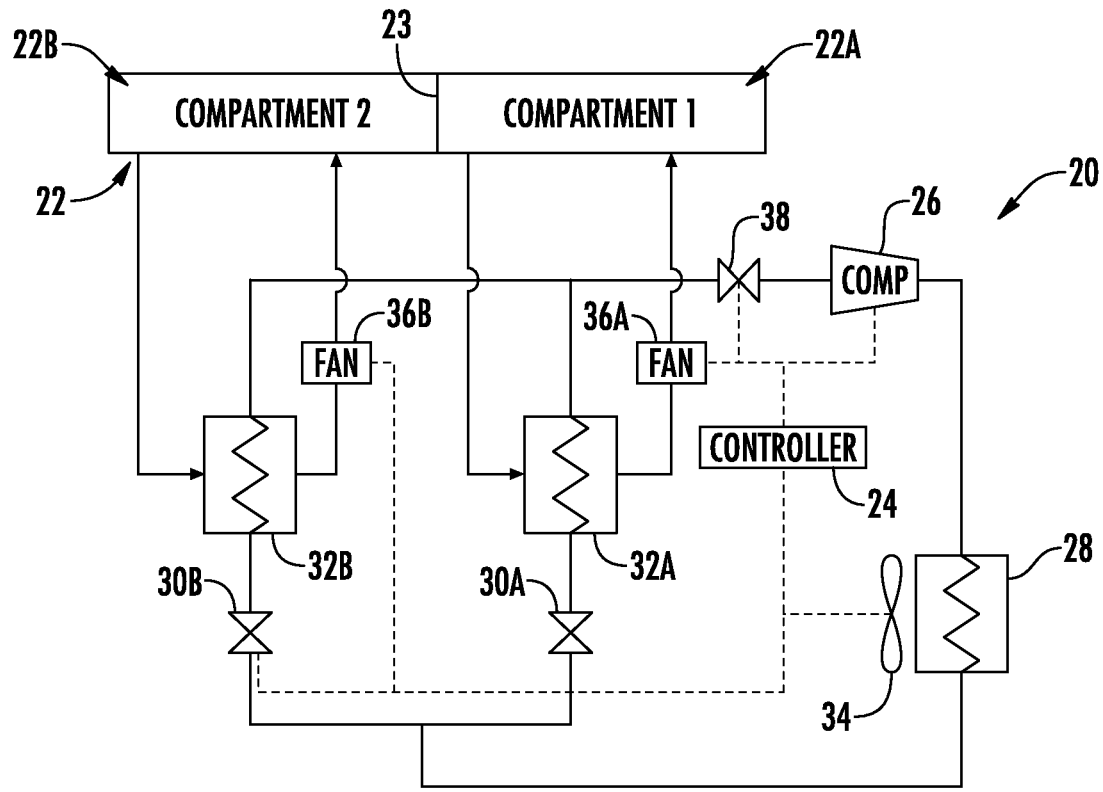
FIG. 1 is a schematic view illustrating a transport refrigeration system.

FIG. 1 illustrates a transport refrigeration system 20 associated with a cargo space 22, such as a refrigerated cargo space. In the illustrated example, the cargo space 22 is divided into a first compartment 22A and a second compartment 22B by a dividing wall 23.

A controller 24 manages operation of the refrigeration system 20 to establish and regulate a desired product storage temperature within the first compartment 22A and the second compartment 22B of the cargo space 22. The cargo space 22 may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The refrigeration system 20 includes a refrigerant compression device 26, a refrigerant heat rejection heat exchanger 28, a first expansion device 30A, a second expansion device 30B, a first refrigerant heat absorption heat exchanger 32A, and a second refrigerant heat absorption heat exchanger 32B connected in a closed loop refrigerant circuit and arranged in a conventional refrigeration cycle. The first and second expansion devices 30A, 30B can be electrically controlled expansion valves controlled by the controller 24 to regulator refrigerant flow through each of the first and second heat absorption heat exchangers 32A, 32B, respectively. The refrigeration system 20 also includes one or more fans 34 associated with the heat rejection heat exchanger 28 and a first and second fan 36A, 36B associated with each of the first and second heat absorption heat exchangers 32A, 32B. In one example, the first and second heat absorption heat exchangers 32A, 32B are evaporators.

It is to be understood that other components (not shown) may be incorporated into the refrigerant circuit as desired, including for example, but not limited to, a suction modulation valve, a receiver, a filter/dryer, an economizer circuit.

The heat rejection heat exchanger 28 may, for example, comprise one or more refrigerant conveying coiled tubes or one or more tube banks formed of a plurality of refrigerant conveying tubes extending between respective inlet and outlet manifolds. The fan(s) 34 are operative to pass air, typically ambient air, across the tubes of the refrigerant heat rejection heat exchanger 28 to cool refrigerant vapor passing through the tubes.

The first and second heat absorption heat exchangers 32A, 32B may, for example, also comprise one or more refrigerant conveying coiled tubes or one or more tube banks formed of a plurality of refrigerant conveying tubes extending between respective inlet and outlet manifolds. The first and second fans 36A, 36B are operative to pass air drawn from the temperature controlled cargo space 22 across the tubes of the heat absorption heat exchangers 32A, 32B to heat the refrigerant passing through the tubes and cool the air. The air cooled in traversing the heat absorption heat exchangers 32A, 32B is supplied back to a respective first and second compartments 22A, 22B in the cargo space 22.

Prior to entering the refrigerant compression device 26, the refrigerant passes through an outlet valve 38. The outlet valve 38 controls a pressure and state of the refrigerant entering the refrigerant compression device 26. The refrigerant compression device 26 may comprise a single-stage or multiple-stage compressor such as, for example, a reciprocating compressor or a scroll compressor.

In the refrigeration system 20, the controller 24 is configured for controlling operation of the refrigeration system 20 including, but not limited to, operation of the various components of the refrigerant system 20 to provide and maintain a desired operating temperature within the cargo space 22. The controller 24 may be an electronic controller including a microprocessor and an associated memory bank. The controller 24 controls operation of various components of the refrigeration system 20, such as the refrigerant compression device 26, the first and second expansion devices 30A, 30B, the fans 34, 36A, 36B, and the outlet valve 38.

Figure 2:
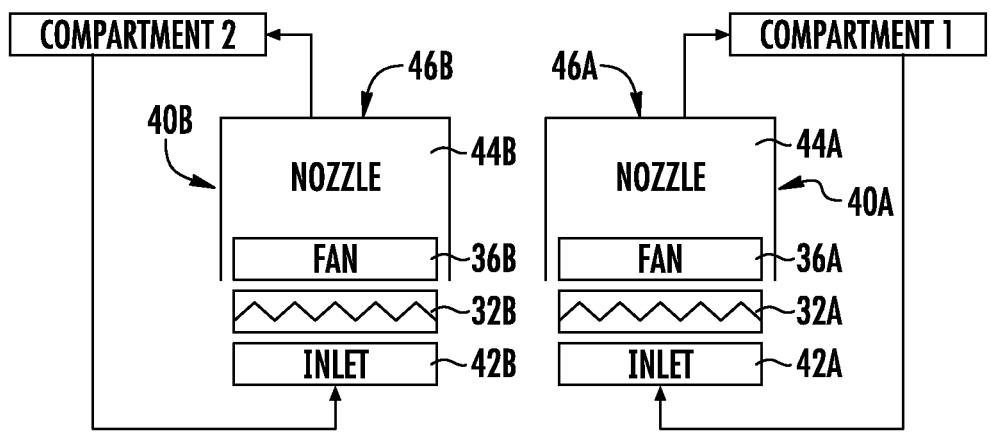
FIG. 2 is a schematic view of the air flow over a pair of heat absorption heat exchangers.

FIG. 2 schematically illustrates air flow from the first and second compartments 22A, 22B through a respective first and second heat absorption heat exchanger 32A, 32B. The air flow from the first compartment 22A flows through a first compartment passageway 40A and back into the first compartment 22A. The first compartment passageway 40A includes a first compartment passageway inlet 42A that accepts air from the first compartment 22A into the first compartment passageway 40A. From the first compartment passageway inlet 42A, the air is drawn by the first fan 36A over the first heat absorption heat exchanger 32A and into a first nozzle 44A. From the first nozzle 44A, the air exits the first compartment passageway 40A through a first compartment passageway outlet 46A and travels back into the first compartment 22A.

Similarly, the air flow from the second compartment 22B flows through a second compartment passageway 40B and back into the second compartment 22B. The second compartment passageway 40B includes a second compartment passageway inlet 42B that accepts air from the second compartment 22B into the second compartment passageway 40B. From the second compartment passageway inlet 42B, the air is drawn by the second fan 36B over the second heat absorption heat exchanger 32B and into a second nozzle 44B. From the second nozzle 44B, the air exits the second compartment passageway 40B through a second compartment passageway outlet 46B and travels back into the second compartment 22B.

In the illustrated example, one of the first and second compartments 22A, 22B could be used to store perishable goods and the other of the first and second compartments 22A, 22B could be used to store frozen goods. Because the first and second compartments 22A, 22B are used to maintain products at different temperatures, the first and second heat absorption heat exchangers 32A, 32B do not need to be the same size or have the same cooling capacity.

The cooling capacities of the first and second absorption heat exchangers 32A, 32B are determined at a common set point temperature to eliminate capacity variation resulting from different air input temperatures. The first and second heat absorption heat exchangers 32A, 32B also each include a first exchanger face surface area and a second exchanger face surface area, respectively. The first and second exchanger face surface area are determined from a length and width of a respective inlet surface on the first and second heat absorption heat exchanger accepting the air from the cargo space 22.

For example, if the first heat absorption heat exchangers 32A is used to maintain the first compartment 22A at a temperature for frozen goods and the second heat absorption heat exchanger 32B is used to maintain the second compartment 22B at a temperature for perishable goods, the first heat absorption heat exchanger 32A is larger than the second heat absorption heat exchanger 32B. The variation in size between the first and second heat absorption heat exchangers 32A, 32B can include varying a cooling surface area, fin density, number of coils, and/or number of coil banks between the first and second heat absorption heat exchangers 32A, 32B.

In one example, at least 55% of the total cooling capacity of the refrigeration system 20 is performed by the first heat absorption heat exchanger 32A and no more than 45% of the total cooling capacity is performed by the second heat absorption heat exchanger 32B. In another example, at least 60% of the total cooling capacity of the refrigeration system 20 is performed by the first heat absorption heat exchanger 32A and no more than 40% of the total cooling capacity is performed by the second heat absorption heat exchanger 32B. In yet another example, at least two thirds of the total cooling capacity of the refrigeration system 20 is performed by the first heat absorption heat exchanger 32A and no more than one third of the total cooling capacity is performed by the second heat absorption heat exchanger 32B.

Furthermore, because the first and second heat absorption heat exchangers 32A, 32B have different cooling capacities to meet the needs for the first and second compartments 22A, 22B, the first and second fans 36A, 36B are able to operate independently of each other as controlled by the controller 24. Because the first and second fans 36A, 36B operate independently, the refrigeration system 20 is able to operate more efficiently by operating the first and second fans 36A, 36B at an optimal speed that does not exceed demand. In addition to variable speeds between the first and second fans 36A, 36B, the first and second fans 36A, 36B can have different maximum flow rates to meet the needs of the first and second compartments 22A, 22B.

Additionally, because the first and second heat absorption heat exchangers 32A, 32B are independently sized to the cooling needs of the first and second compartments 22A, 22B, the heat absorption heat exchanger that is more susceptible to icing can be enlarged to have a greater liquid capacity to reduce the frequency defrosting without adversely impacting the other heat absorption heat exchanger.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A transportation refrigeration system comprising:
a refrigeration circuit including a compressor, a condenser, a first expansion valve upstream of a first heat exchanger, a second expansion valve upstream of a second heat exchanger, and an outlet valve immediately downstream in the refrigeration circuit of the first heat exchanger and the second heat exchanger, wherein the first heat exchanger includes a first cooling capacity that is different from a second cooling capacity of the second heat exchanger, wherein an outlet of the first heat exchanger in the refrigeration circuit joins an outlet of the second heat exchanger prior to the outlet valve.

2. The transportation refrigeration system of claim 1, further comprising a first compartment passageway having a first compartment passageway inlet located upstream of the first heat exchanger and a first fan located downstream of the first heat exchanger.

3. The transportation refrigeration system of claim 2, including a first nozzle downstream of the first fan having a first compartment outlet, wherein the first heat exchanger is located outside of first compartment and fluidly connected to the first compartment through the first nozzle.

4. The transportation refrigeration system of claim 3, further comprising a second compartment passageway having a second compartment passageway inlet located upstream of the second heat exchanger and a second fan located downstream of the second heat exchanger.

5. The transportation refrigeration system of claim 4, including a second nozzle downstream of the second fan having a second compartment outlet, wherein the second heat exchanger is located outside of second compartment and fluidly connected to the second compartment through the second nozzle.

6. The transportation refrigeration system of claim 5, wherein the first compartment outlet is spaced from the second compartment outlet.

7. The transportation refrigeration system of claim 5, wherein the first cooling capacity is greater than the second cooling capacity, the first fan includes a first maximum flow rate, and the second fan includes a second maximum flow rate that is less than the first maximum flow rate.

8. The transportation refrigeration system of claim 5, wherein the first cooling capacity includes at least 55% of a total cooling capacity of the refrigeration system and the second cooling capacity includes no more than 45% of the total cooling capacity of the refrigeration system.

9. The transportation refrigeration system of claim 8, wherein the first cooling capacity includes at least two thirds of the total cooling capacity of the refrigeration system and the second cooling capacity includes no more than one third of the total cooling capacity of the refrigeration system.

10. The transportation refrigeration system of claim 8, wherein the first heat exchanger includes a first fin density and the second heat exchanger includes a second fin density and the first fin density is different from the second fin density and the first heat exchanger is fluidly isolated from the second heat exchanger.

11. The transportation refrigeration system of claim 8, wherein the first heat exchanger includes a first exchanger face surface area and the second heat exchanger includes a second exchanger face surface area and the first exchanger face surface area is greater than the second exchanger face surface area.

12. The transportation refrigeration system of claim 8, wherein the first expansion valve is a first electronically controlled expansion valve and the second expansion valve is a second electronically controlled expansion valve and a controller is configured to control refrigerant flow to the first heat exchanger by controlling the first electronically controlled expansion valve and is configured to control refrigerant flow to the second heat exchanger by controlling the second electronically controlled expansion valve.

13. A method of operating a refrigeration cycle comprising the steps of:
conditioning a first compartment in a cargo space to a first temperature with a first heat exchanger having a first cooling capacity; and
conditioning a second compartment in the cargo space to a second temperature with a second heat exchanger having a second cooling capacity with an outlet valve immediately downstream in the refrigeration cycle of the first heat exchanger and the second heat exchanger; wherein the first cooling capacity is greater than the second cooling capacity.

14. The method of claim 13, wherein the first cooling capacity includes at least 55% of a total cooling capacity of the refrigeration system and the second cooling capacity includes no more than 45% of the total cooling capacity of the refrigeration system.

15. The method of claim 14, wherein the first cooling capacity includes at least two thirds of the total cooling capacity of the refrigeration system and the second cooling capacity includes no more than one third of the total cooling capacity of the refrigeration system.

16. The method of claim 14, wherein the first heat exchanger includes a first fin density and the second heat exchanger includes a second fin density and the first fin density is different from the second fin density.

17. The method of claim 14, wherein the first heat exchanger includes a first exchanger face surface area and the second heat exchanger includes a second exchanger face surface area and the first exchanger face surface area is greater than the second exchanger face surface area.

18. The method of claim 14, further comprising:
operating a first fan associated with the first heat exchanger at a first maximum flow rate for the first fan; and
operating a second fan associated with the second heat exchanger at a second maximum flow rate for the second fan and the second maximum flow rate that is less than the first maximum flow rate.

19. The method of claim 18, wherein operating the first fan includes drawing air from the first compartment into a first compartment passageway inlet, over the first heat exchanger and through a first nozzle having a first compartment passageway outlet and the first compartment passageway inlet and the first heat exchanger are both located outside of the first compartment.

20. The method of claim 19, wherein operating the second fan includes drawing air from the second compartment into a second compartment passageway inlet, over the second heat exchanger and through a second nozzle having a second compartment passageway outlet spaced from the first compartment passageway outlet and the second compartment passageway inlet and the second heat exchanger are both located outside of the second compartment.

21. The method of claim 19, further comprising:
controlling a pressure and state of a refrigerant with the outlet valve.

* * * * *